United States Patent
Luo et al.

(10) Patent No.: US 8,493,942 B2
(45) Date of Patent: Jul. 23, 2013

(54) INTERFERENCE CANCELLATION IN WIRELESS COMMUNICATION

(75) Inventors: Tao Luo, San Diego, CA (US); Durga Prasad Malladi, San Diego, CA (US); Sharad Deepak Sambhwani, San Diego, CA (US); Waleed M. Younis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 742 days.

(21) Appl. No.: 11/492,609

(22) Filed: Jul. 24, 2006

(65) Prior Publication Data

US 2007/0121554 A1 May 31, 2007

Related U.S. Application Data

(60) Provisional application No. 60/704,861, filed on Aug. 1, 2005.

(51) Int. Cl.
*H04B 7/216* (2006.01)

(52) U.S. Cl.
USPC .......................................................... 370/335

(58) Field of Classification Search
USPC ................. 370/431, 317, 328, 332, 229, 329, 370/235, 342, 441, 252, 479; 375/130, 140, 375/147, 148; 455/452.1
See application file for complete search history.

(56) References Cited

U.S. PATENT DOCUMENTS

| | | | |
|---|---|---|---|
| 6,456,653 B1 * | 9/2002 | Sayeed | 375/227 |
| 6,483,821 B1 * | 11/2002 | Dabak et al. | 370/329 |
| 6,683,907 B2 * | 1/2004 | Ling | 375/147 |
| 6,889,056 B2 * | 5/2005 | Shibutani | 455/522 |
| 2002/0136278 A1 * | 9/2002 | Nakamura et al. | 375/148 |
| 2002/0154717 A1 * | 10/2002 | Shima et al. | 375/349 |
| 2002/0160814 A1 * | 10/2002 | Miya | 455/562 |
| 2002/0164967 A1 * | 11/2002 | Miyoshi et al. | 455/226.1 |

(Continued)

FOREIGN PATENT DOCUMENTS

| | | |
|---|---|---|
| CN | 1369981 A | 9/2002 |
| EP | 1229668 A2 | 8/2002 |

(Continued)

OTHER PUBLICATIONS

3GPP TS 25.211 v6.5.0; "3rd Generation Partnership Project; Technical Specification Group Radio Access Network; Physical channels and mapping of transport channels onto physical channels (FDD)," 3GPP TS 25.211 version 6.5.0, release 6 (Jun. 2005).

(Continued)

*Primary Examiner* — Jung-Jen Liu
(74) *Attorney, Agent, or Firm* — Stanton Braden

(57) ABSTRACT

Techniques for recovering transmissions on data and control channels with interference cancellation are described. A receiver derives a first interference estimate for a first channel based on a first channel estimate and cancels the first interference estimate from an input signal. The receiver thereafter derives a second interference estimate for the first channel based on a second channel estimate and cancels the second interference estimate in place of the first interference estimate from the input signal. The receiver may derive the first channel estimate based on pilot symbols and may derive the second channel estimate based on a correctly decoded packet. The second channel estimate may be of higher quality than the first channel estimate.

24 Claims, 8 Drawing Sheets

U.S. PATENT DOCUMENTS

| | | | | |
|---|---|---|---|---|
| 2002/0191578 | A1* | 12/2002 | Bachl et al. | 370/342 |
| 2003/0219069 | A1* | 11/2003 | Chen et al. | 375/227 |
| 2004/0028013 | A1* | 2/2004 | Fitton et al. | 370/335 |
| 2004/0085917 | A1* | 5/2004 | Fitton et al. | 370/292 |
| 2005/0002478 | A1* | 1/2005 | Agami et al. | 375/345 |
| 2005/0152478 | A1* | 7/2005 | Jalloul et al. | 375/340 |
| 2005/0265433 | A1* | 12/2005 | Okumura et al. | 375/148 |
| 2006/0003787 | A1* | 1/2006 | Heo et al. | 455/522 |
| 2006/0057958 | A1* | 3/2006 | Ngo et al. | 455/7 |
| 2006/0109938 | A1* | 5/2006 | Challa et al. | 375/347 |
| 2006/0133521 | A1* | 6/2006 | Sampath et al. | 375/260 |
| 2006/0141935 | A1 | 6/2006 | Hou et al. | |
| 2006/0209869 | A1* | 9/2006 | Kim et al. | 370/431 |
| 2006/0240859 | A1* | 10/2006 | Gervais et al. | 455/522 |

FOREIGN PATENT DOCUMENTS

| | | |
|---|---|---|
| JP | 2002217871 A | 8/2002 |
| JP | 2003209530 | 7/2003 |
| JP | 200520402 | 1/2005 |
| TW | 576032 | 2/2004 |
| TW | 584992 | 4/2004 |
| WO | 02/51023 A2 | 6/2002 |

OTHER PUBLICATIONS

3GPP TS 25.212 v6.5.0; "3rd Generation Partnership Project; Technical Specification Group Radio Access Network; Multiplexing and channel coding (FDD)," 3GPP TS 25.212 version 6.5.0 release 6 (Jun. 2005).

3GPP R1-030667; "HARQ Efficiency in E-DPDCH," Qualcomm Europe, Aug. 25-29, 2003.

3GPP R1-031009; "Performance of E-TFI Transmission with 2ms and 10ms TTI," Qualcomm Europe. Oct. 6-10, 2003.

3GPP R1-040895; "E-TFICH Performance with Synchronous HARQ," Qualcomm Europe, Aug. 16-20, 2004.

International Search Report—PCT/US2006/029906,.International Search Authority—European Patent Office—Nov. 24, 2006.

Written Opinion—PCT/US2006/029906, International Search Authority—European Patent Office—Nov. 24, 2006.

International Preliminary Report on Patentability—PCT/US2006/029906, International Bureau of WIPO—Geneva, Switzerland—Feb. 5, 2008.

Taiwanese Search report—095128162—TIPO—Jul. 12, 2010.

* cited by examiner

INTERFERENCE CANCELLATION IN WIRELESS COMMUNICATION

CLAIM OF PRIORITY UNDER 35 U.S.C. §119

The present Application for Patent claims priority to Provisional Application Ser. No. 60/704,861, entitled "Enhanced Interface Cancellation for Channels Not Supported by HARQ," filed Aug. 1, 2005, assigned to the assignee hereof, and expressly incorporated herein by reference.

BACKGROUND

I. Field

The present disclosure relates generally to communication, and more specifically to techniques for performing interference cancellation in wireless communication.

II. Background

A wireless multiple-access communication network can concurrently communicate with multiple terminals on the downlink and uplink. The downlink (or forward link) refers to the communication link from the base stations to the terminals, and the uplink (or reverse link) refers to the communication link from the terminals to the base stations. Multiple terminals may simultaneously receive signaling and data on the downlink and/or transmit signaling and data on the uplink. This may be achieved by multiplexing the transmissions to be orthogonal to one another (e.g., for the downlink) and/or by controlling the transmit power of each transmission to achieve a desired received signal quality for the transmission while reducing interference to other transmissions (e.g., for the uplink).

A base station may receive transmissions from multiple terminals within its coverage area. The transmission from each terminal acts as interference to the transmissions from other terminals. The interference hinders the base station's ability to recover the transmission from each terminal and may adversely impact system performance.

There is therefore a need in the art for techniques to recover transmissions in the presence of interference from other transmissions.

SUMMARY

Techniques for recovering transmissions on data and control channels with interference cancellation are described herein. The techniques may improve performance by estimating and canceling interference as early as possible and using higher quality channel estimate and/or more reliable information when available.

According to an exemplary embodiment, an apparatus is described which includes at least one processor and a memory. The processor(s) derive a first interference estimate for a first channel based on a first channel estimate and cancel the first interference estimate from an input signal. The processor(s) thereafter derive a second interference estimate for the first channel based on a second channel estimate and cancel the second interference estimate in place of the first interference estimate from the input signal. The first channel estimate may be derived based on pilot symbols. The second channel estimate may be derived based on a correctly decoded packet and may be of higher quality than the first channel estimate.

According to another exemplary embodiment, an apparatus is described which includes at least one processor and a memory. The processor(s) derive a channel estimate based on a data channel, derive at least one interference estimate for at least one control channel based on the channel estimate, and cancel the at least one interference estimate from an input signal.

Various aspects and exemplary embodiments of the invention are described in further detail below.

DETAILED DESCRIPTION

The word "exemplary" is used herein to mean "serving as an example, instance, or illustration." Any exemplary embodiment described herein as "exemplary" is not necessarily to be construed as preferred or advantageous over other exemplary embodiments.

The techniques described herein may be used for various wireless communication networks such as Code Division Multiple Access (CDMA) networks, Time Division Multiple Access (TDMA) networks, Frequency Division Multiple Access (FDMA) networks, and Orthogonal FDMA (OFDMA) networks. The terms "network" and "system" are often used interchangeably. A CDMA network may implement a radio technology such as Wideband-CDMA (W-CDMA), cdma2000, and so on. cdma2000 covers IS-2000, IS-856 and IS-95 standards. A TDMA network may implement a radio technology such as Global System for Mobile Communications (GSM). These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). The techniques may be used for uplink transmissions as well as downlink transmissions. For clarity, the techniques are described below for uplink transmissions in Universal Mobile Telecommunication System (UMTS), which utilizes W-CDMA.

Figure 1:
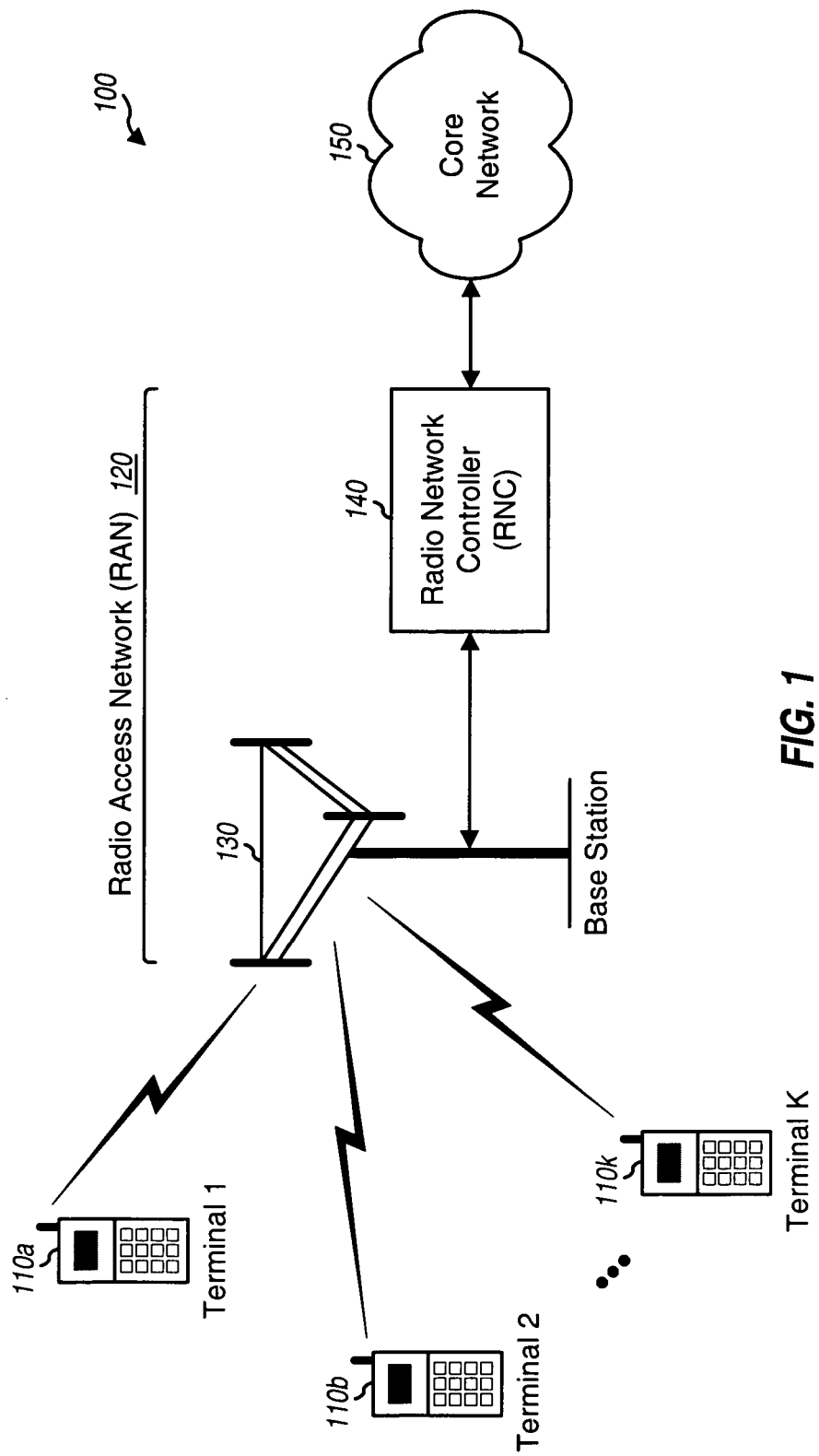
FIG. 1 shows a wireless communication network.

FIG. 1 shows a wireless communication network 100 that includes a radio access network (RAN) 120 and a core network 150. Radio access network 120 may include any number of base stations, any number of Radio Network Controllers (RNCs), and other network entities. For simplicity, only one base station 130 and one RNC 140 are shown in FIG. 1. A base station is generally a fixed station that communicates with the terminals and may also be referred to as a Node B, an access point, or some other terminology. Base station 130 provides communication coverage for a particular geographic area and supports communication for the terminals located within the coverage area. RNC 140 provides coordination and control for base station 130. Core network 150 may include various network entities that support various functions such as packet routing, user registration, mobility management, and so on.

Terminals 110a through 110k communicate with base station 130 in radio access network 120. A terminal may be stationary or mobile and may also be referred to as a user equipment (UE), a mobile station (MS), an access terminal (AT), a subscriber unit, a station (STA), or some other terminology. A terminal may be a cellular phone, a wireless device, a personal digital assistant (PDA), a handheld device, a wireless modem, a laptop computer, and so on. The terms "terminal" and "user" are used interchangeably herein.

In UMTS, data for a terminal is processed as one or more transport channels at a higher layer. The transport channels may carry data for one or more services, e.g., voice, video, packet data, and so on. The transport channels are mapped to physical channels at a physical layer. The physical channels are channelized with different channelization codes and are orthogonal to one another in code domain.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively.

Table 1 lists some uplink physical channels in UMTS and provides a short description for each uplink channel. The DPCCH and DPDCH are control and data channels, respectively, normally used for voice and low rate data. The E-DPCCH and E-DPDCH are control and data channels, respectively, for high rate data in HSUPA. The HS-DPCCH is a feedback channel for HSDPA. A radio link for a terminal may include one DPCCH, zero, one, or multiple DPDCHs, at most one E-DPCCH, and zero, one, or multiple E-DPDCHs. HARQ is used for the E-DPDCH and not for other uplink channels.

TABLE 1

Uplink Channels

| Channel | Channel Name | HARQ | Description |
| --- | --- | --- | --- |
| DPCCH | Dedicated Physical Control Channel | No | Carry pilot, format information for DPDCH, and other signaling |
| DPDCH | Dedicated Physical Data Channel | No | Carry voice or low rate data from a terminal. |
| E-DPCCH | E-DCH Dedicated Physical Control Channel | No | Carry signaling for E-DPDCH. |
| E-DPDCH | E-DCH Dedicated Physical Data Channel | Yes | Carry uplink packets from the terminal. |
| HS-DPCCH | Dedicated Physical Control Channel for HS-DSCH | No | Carry feedback for downlink transmission in HSDPA. |

Enhanced Dedicated Channel (E-DCH) is a transport channel used for HSDPA and HSUPA.

Figure 2:
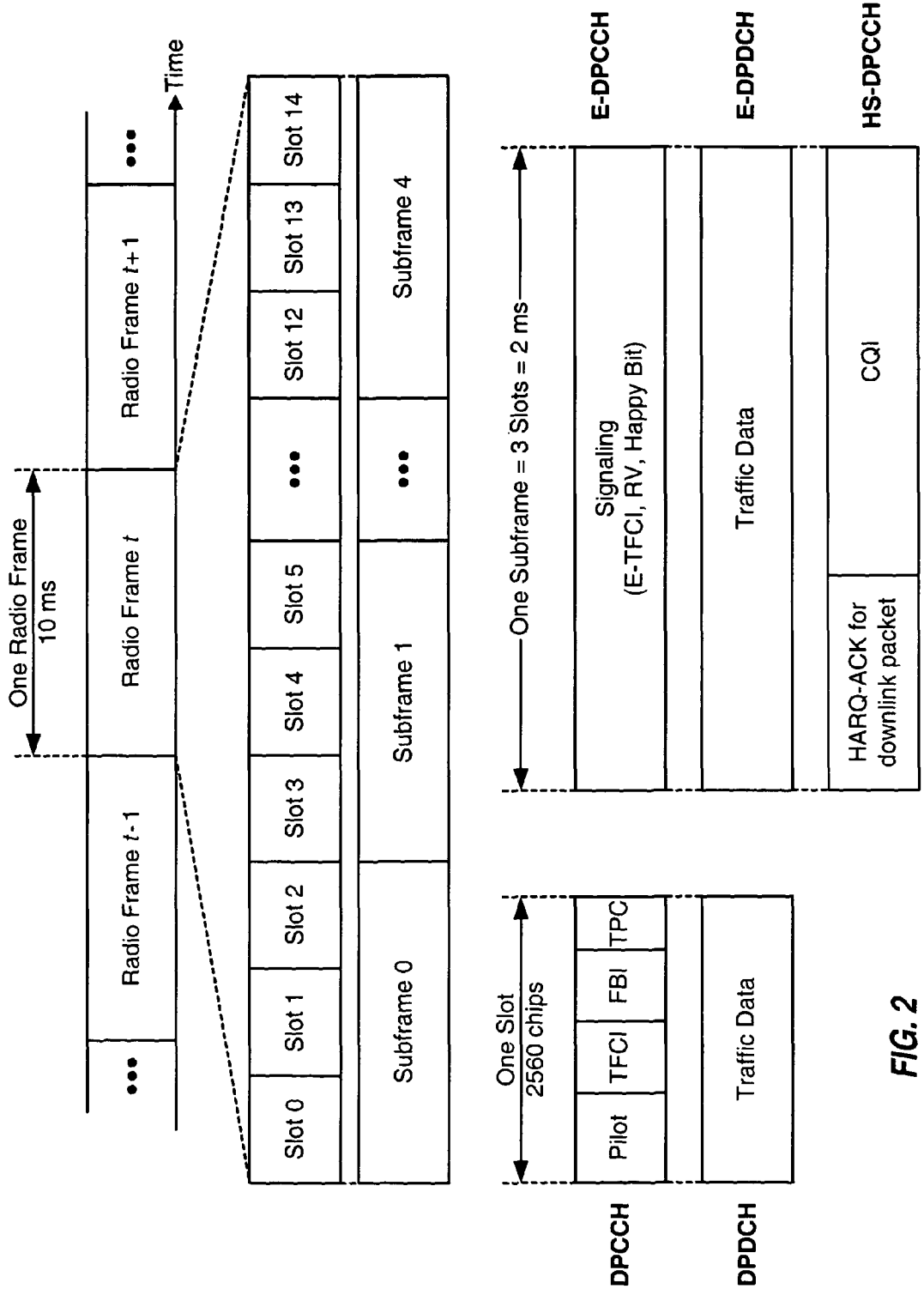
FIG. 2 shows frame and channel formats in W-CDMA.

FIG. 2 shows a frame format in W-CDMA. The timeline for transmission is divided into radio frames. Each radio frame has a duration of 10 milliseconds (ms) and is identified by a 12-bit system frame number (SFN). Each radio frame is further partitioned into 15 slots, which are labeled as slot 0 through slot 14. Each slot has a duration of 0.667 ms and includes 2560 chips at 3.84 Mcps. Each ratio frame is also partitioned into five subframes 0 through 4. Each subframe has a duration of 2 ms and spans 3 slots.

FIG. 2 also shows the formats of the uplink channels listed in Table 1. The DPCCH includes a pilot field, a transport format combination indicator (TFCI) field, a feedback information (FBI) field, and a transmit power control (TPC) field in one slot. The pilot field carries pilot symbols. The TFCI field carries format information for the DPDCH. The FBI field carries feedback, e.g., for transmit diversity. The TPC field carries power control information to direct a base station to adjusts its transmit power for downlink transmission to a terminal. The number of bits in each field is zero or greater and is determined by a slot format selected for use. The DPDCH carries traffic data.

The E-DPCCH carries signaling for the E-DPDCH. The signaling for one subframe includes a 7-bit TFCI for the E-DPDCH (E-TFCI), a 2-bit redundancy version (RV), and a happy bit. The E-TFCI conveys format information for the E-DPDCH. The RV indicates a retransmission count for a packet being sent on the E-DPDCH and is derived from a retransmission sequence number (RSN) provided by higher layer. The happy bit indicates whether or not the terminal is happy with the current grant on the uplink. The 10 signaling bits are block encoded with a Reed-Muller block code to generate 30 code bits, which are sent on the E-DPCCH in one subframe.

The E-DPDCH (or multiple E-DPDCHs) may carry a packet in a subframe. A packet may also be referred to as a transport block, a data block, a data frame, and so on. Each packet is attached with a cyclic redundancy check (CRC) value that is used for error detection of that packet.

The HS-DPCCH includes an HARQ-ACK field and a channel quality indicator (CQI) field in one subframe. The HARQ-ACK field carries an acknowledgement (ACK) or a negative acknowledgement (NAK) for a downlink packet. The CQI field carries a 5-bit CQI value that indicates the downlink channel quality.

Figure 3:
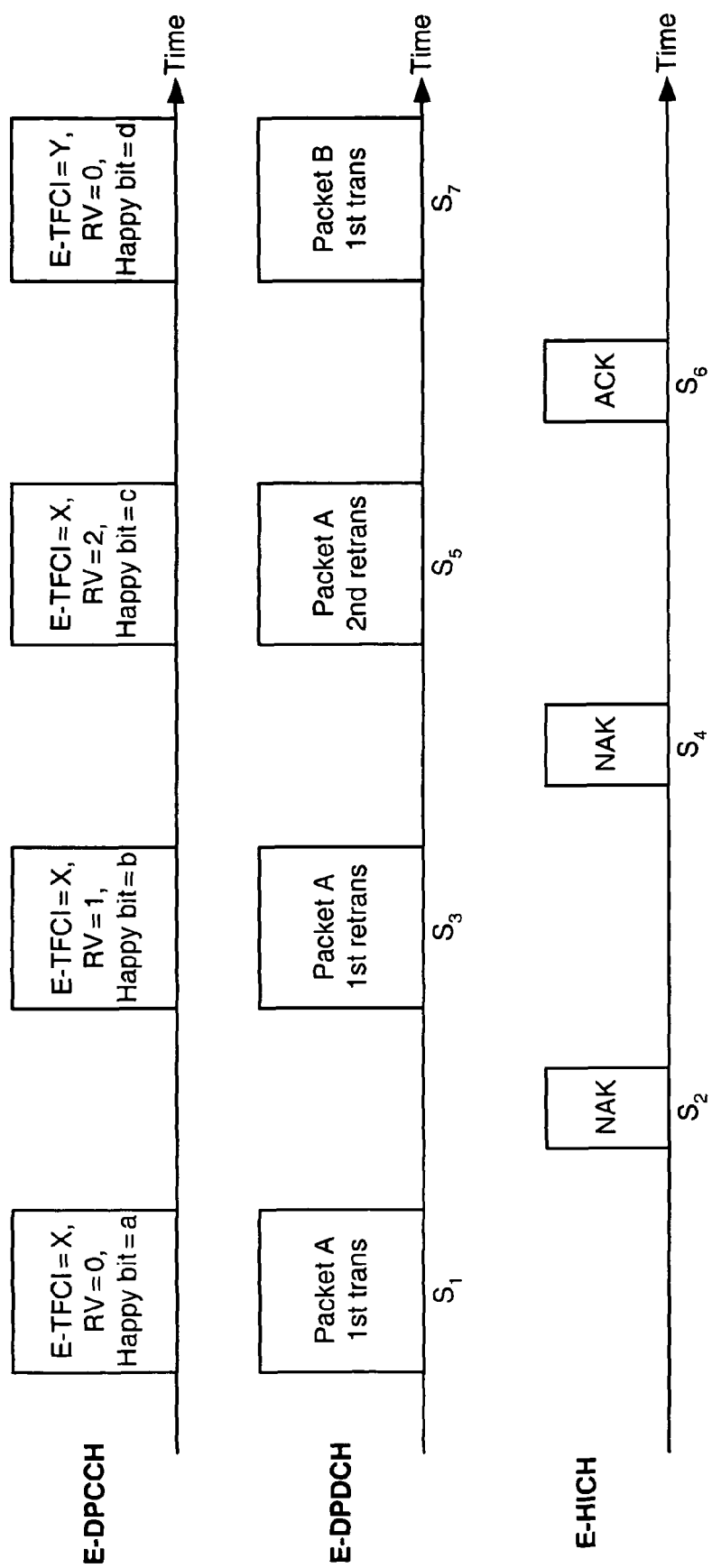
FIG. 3 shows an exemplary hybrid automatic retransmission (HARQ) transmission.

FIG. 3 shows an exemplary HARQ transmission on the uplink with HSUPA. HARQ may be employed to improve reliability of data transmission. A terminal processes (e.g., encodes, interleaves, and modulates) packet A and transmits the packet on the E-DPDCH in subframe $S_1$. A transmission time interval (TTI) of 2 ms may be selected, in which case each packet transmission or retransmission is sent in one subframe. The base station receives the transmission, decodes packet A in error, and sends a NAK on an E-DCH Hybrid ARQ Indicator Channel (E-HICH) in subframe $S_2$. The terminal receives the NAK and retransmits packet A in subframe $S_3$. The base station receives the retransmission, decodes packet A based on the original transmission and the retransmission, and sends a NAK in subframe $S_4$ when the packet is decoded in error. The terminal receives the NAK and retransmits packet A again in subframe $S_5$. The base station receives the second retransmission, decodes packet A based on the original transmission and the two retransmissions, and sends an ACK in subframe $S_6$ when the packet is decoded correctly. The terminal then processes and transmits the next packet B in similar manner as packet A.

For HARQ, the terminal transmits a packet once and may retransmit the packet up to N times until an ACK is received for the packet or the terminal abandons the transmission of the packet. N is the maximum number of retransmissions, is a configurable value that can range from zero to 15, or $0 \leq N \leq 15$, and is typically set to four for 2 ms TTI. The terminal may process and send packets such that a target packet error rate (PER) is achieved after $N_{target}$ retransmissions, where $N_{target}$ is typically greater than 0 and less than N. Hence, the base station can correctly decode the packets after $N_{target}$ retransmissions, on average. The initial PER after the first transmission may thus be high. For example, $N_{target}$ may be equal to two, N may be equal to three, and base station may correctly decode the packets after the initial transmission and two retransmissions, on average.

FIG. 3 also shows the signaling sent on the E-DPCCH in each subframe in which data is sent on the E-DPDCH. The signaling for subframe $S_1$ includes an E-TFCI value of X, an RV value of 0, and a happy bit of a. The signaling for subframe $S_3$ includes the same E-TFCI value of X, an RV value of 1, and a happy bit of b. The signaling for subframe $S_5$ includes the same E-TFCI value of X, an RV value of 2, and a happy bit of c. The signaling for subframe $S_7$ includes an E-TFCI value of Y, an RV value of 0, and a happy bit of d. As shown in FIG. 3, the content of the E-DPCCH may be correlated from transmission to transmission. The same 7-bit E-TFCI value is sent for all re/transmissions of a given packet. The 2-bit RV is incremented by one for each retransmission of the packet. The happy bit may change from transmission to transmission but is typically slowly varying.

Figure 4:
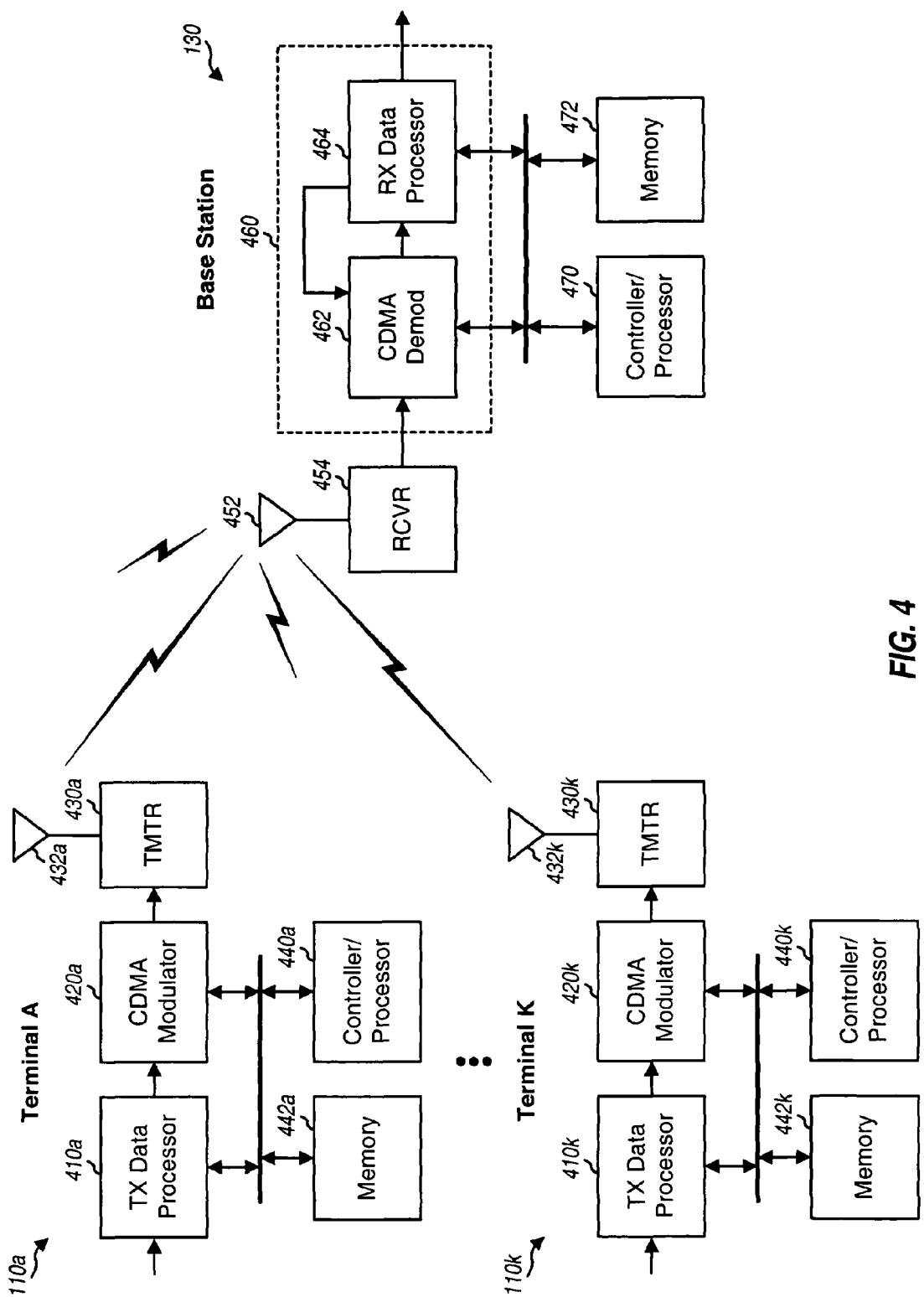
FIG. 4 shows a block diagram of multiple terminals and a base station.

FIG. 4 shows a block diagram of terminals 110a and 110k and base station 130 in FIG. 1. At terminal 110a, a transmit (TX) data processor 410a processes (e.g., encodes, interleaves, and symbol maps) data and signaling and generates data and signaling symbols, respectively. As used herein, a data symbol is a symbol for data, a signaling symbol is a symbol for signaling or control information, a pilot symbol is a symbol for pilot, and pilot is data that is known a priori by both the terminal and the base station. The data, signaling, and pilot symbols may be modulation symbols from a signal constellation for PSK, QAM, or some other modulation scheme: TX data processor 410a also generates and appends a CRC value to each packet sent on the DPDCH and E-DPDCH. A CDMA modulator 420a processes the data, signaling, and pilot symbols and provides output chips to a transmitter (TMTR) 430a. Transmitter 430a processes (e.g., converts to analog, amplifies, filters, and frequency upconverts) the output chips and generates an uplink signal, which is transmitted from an antenna 432a. Terminal 110k and other terminals may process and transmit data, signaling and pilot on the uplink in similar manner as terminal 110a.

At base station 110, an antenna 452 receives the uplink signals from terminals 110a and 110k as well as other terminals. Antenna 452 provides a receiver input signal to a receiver (RCVR) 454. Receiver 454 processes (e.g., filters, amplifies, frequency downconverts, and digitizes) the receiver input signal and provides input samples to a receive (RX) processor 460. Within RX processor 460, a CDMA demodulator (Demod) 462 processes the input samples and provides detected symbols, which are estimates of the data and signaling symbols sent by the terminals. CDMA demodulator 462 may implement a rake receiver and/or an equalizer, each of which can combine energy from multiple signal paths. An RX data processor 464 processes (e.g., symbol demaps, deinterleaves, and decodes) the detected symbols and provides decoded data and signaling. The processing by CDMA demodulator 462 and RX data processor 464 is complementary to the processing by CDMA modulator 420 and TX data processor 410, respectively, at each terminal.

Controllers/processors 440a, 440k and 470 direct operation of various processing units at terminals 110a and 110k and base station 130, respectively. Memories 442a, 442k and 472 store data and program codes for terminals 110a and 110k and base station 130, respectively.

Figure 5:
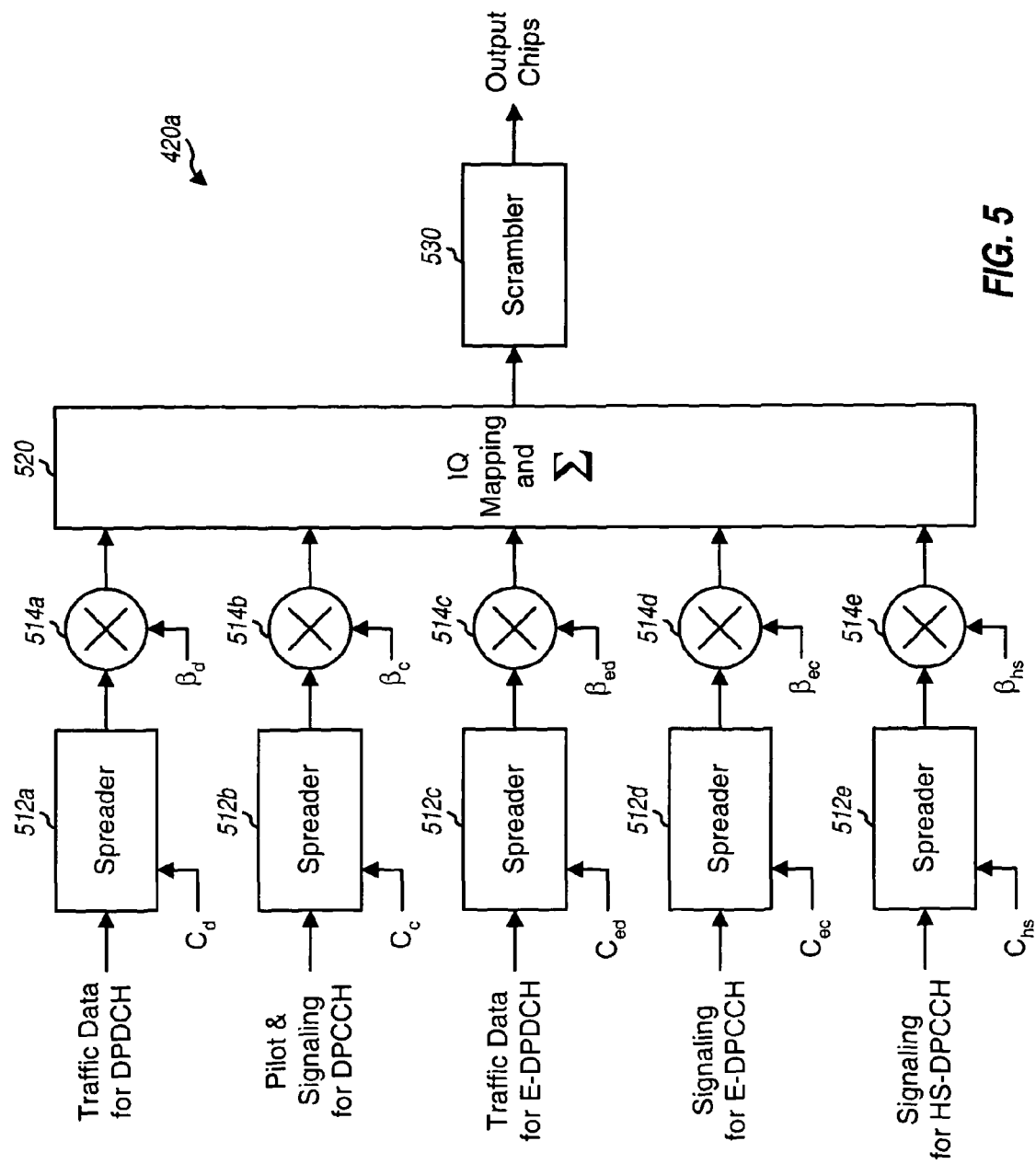
FIG. 5 shows a block diagram of a CDMA modulator at a terminal.

FIG. 5 shows a block diagram of CDMA modulator 420a at terminal 110a. Within CDMA modulator 420a, a spreader 512a spreads data symbols for the DPDCH with a channelization code $C_d$ and provides data chips. Spreader 512a repeats each data symbol to generate L replicated symbols, where L is the length of code $C_d$. Spreader 512 then multiplies the L replicated symbols with the L chips of code $C_d$ to generate L data chips for the data symbol. A multiplier 514a multiplies the output of spreader 512a with a gain factor $\beta_d$ for the DPDCH.

The pilot and signaling symbols for the DPCCH are spread by a spreader 512b and scaled by a multiplier 514b with a gain factor $\beta_c$. The data symbols for the E-DPDCH are spread by a spreader 512c and scaled by a multiplier 514c with a gain factor $\beta_{ed}$. The signaling symbols for the E-DPCCH are spread by a spreader 512d and scaled by a multiplier 514d with a gain factor $\beta_{ec}$. The signaling symbols for the HS-DPCCH are spread by a spreader 512e and scaled by a multiplier 514e with a gain factor $\beta_{hs}$.

A unit 520 maps the output of each multiplier 514 to inphase (I) and/or quadrature (Q) paths, sums the mapped chips for all uplink channels, and provides complex-valued chips. A scrambler 530 multiplies the output of unit 520 with a scrambling code $S_{dpch,n}$ for terminal 110a and provides output chips.

The gain factors $\beta_d$ and $\beta_{ed}$ determine the amount of transmit power to use for traffic data. The gain factors $\beta_c$, $\beta_{ec}$ and $\beta_{hs}$ determine the amount of transmit power to use for pilot and signaling. The transmit power of the DPCCH may be adjusted by a power control mechanism to achieve a target received signal quality at the base station. This target received signal quality may be, e.g., an energy-per-chip-to-total-noise ratio ($E_{cp}/N_t$) of −21 decibel (dB) or some other value. The transmit power of the other uplink channels may be set relative to the transmit power of the DPCCH by controlling the gain factors. The power ratio between the E-DPCCH to DPCCH may be 1 dB for 2 ms TTI. A traffic-to-pilot ratio (TtoP) is the ratio of traffic power to pilot power and may be given in units of dB as: TtoP=20·log$_{10}$($\beta_d/\beta_c$) for the DPDCH and 20·log$_{10}$($\beta_{ed}/\beta_{ec}$) for the E-DPDCH. The traffic-to-pilot ratio is typically selected to achieve good performance and may range, e.g., from 0 to 20 dB. The aggregate power of the DPCCH, E-DPCCH, HS-DPCCH and DPDCH is typically a non-negligible portion of the total power of all uplink channels.

The base station may recover the uplink channels shown in Table 1 and FIG. 5 in a particular order. The base station may first process the DPCCH to obtain a channel estimate and to recover the TFCI for the DPDCH. The base station may then process the DPDCH with the channel estimate and in accordance with the TFCI to recover data sent on the DPDCH. The base station may process the E-DPCCH to recover the E-TFCI and RV for the E-DPDCH. The base station may then process the E-DPDCH in accordance with the E-TFCI and RV to recover data sent on the E-DPDCH. The base station may also process the HS-DPCCH to recover signaling sent on this channel.

Figure 6:
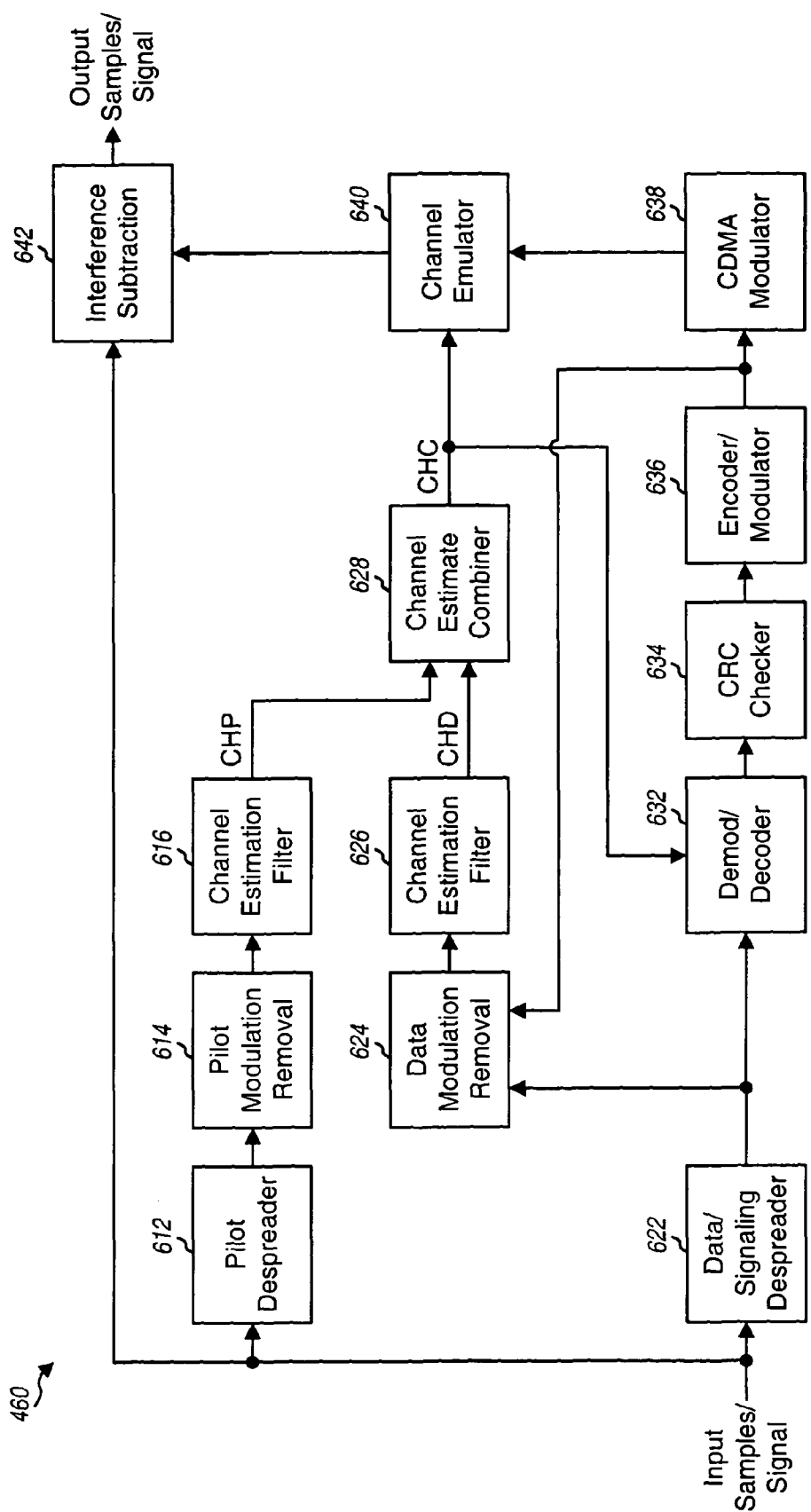
FIG. 6 shows a block diagram of a receive (RX) processor at the base station.

FIG. 6 shows a block diagram of an exemplary embodiment of RX processor 460 in FIG. 4. RX processor 460 can derive (1) a pilot-based channel estimate based on pilot symbols and (2) a data-based channel estimate based on data symbols for packets that are correctly decoded. RX processor 460 can also estimate and remove interference from each uplink channel that is recovered. The processing for one terminal (e.g., terminal 110a, 110b or 110k in FIG. 1) is described below.

Within RX processor 460, a pilot despreader 612 despreads the input samples/input signal with channelization code $C_c$ for the DPCCH and provides despread pilot symbols. A unit 614 removes the modulation on the despread pilot symbols and provides channel gain estimates. A channel estimation filter 616 filters the channel gain estimates and provides a pilot-based channel estimate, CHP. A channel estimate combiner 628 receives the pilot-based channel estimate from filter 616 and may also receive a data-based channel estimate, CHD, from a channel estimation filter 626. Combiner 628 derives an output channel estimate, CHC, based on the pilot-based and/or pilot-based channel estimates, as described below.

A data/signaling despreader 622 despreads the input signal with channelization code $C_c$ for the DPCCH, $C_d$ for the DPDCH, $C_{ec}$ for the E-DPCCH, $C_{ed}$ for the E-DPDCH, or $C_{hs}$ for the HS-DPCCH and provides despread symbols. A demodulator/decoder 632 performs coherent detection on the despread symbols with the output channel estimate from combiner 628 to obtain detected symbols. Unit 632 further processes (e.g., decodes) the detected symbols for the control channels (e.g., the DPCCH, E-DPCCH and/or HS-DPCCH) and provides recovered signaling for the control channels. Unit 632 also processes (e.g., deinterleaves and decodes) the detected symbols for the data channels (e.g., the DPDCH and/or E-DPDCH) in accordance with the recovered signaling (e.g., TFCI and/or E-TFCI) and provides decoded data for the data channels. A CRC checker 634 checks each decoded packet for the data channels and determines whether the packet is decoded correctly or in error.

In an exemplary embodiment, a data-based channel estimate is derived from each packet that is decoded correctly. An encoder/modulator 636 processes (e.g., encodes, interleaves, and modulates) a correctly decoded packet in the same manner as performed by the terminal and provides regenerated data symbols. A unit 624 removes the modulation on the despread data symbols with the regenerated data symbols and provides data-based channel gain estimates. Channel estimation filter 626 filters the channel gain estimates and provides the data-based channel estimate, CHD. The channel gain estimates from unit 624 may be derived from many data symbols that have been correctly decoded and may thus be more reliable than the pilot-based channel gain estimates from unit 614. Filter 626 may implement a filter that can provide good performance for higher signal-to-noise ratio (SNR).

Channel estimate combiner 628 receives the pilot-based channel estimate from filter 616 and the data-based channel estimate from filter 626. Combiner 628 may select one of the two channel estimates or may combine the two channel estimates. Combiner 628 may provide the data-based channel estimate if it is available and not stale (e.g., obtained within a predetermined number of slots), if the traffic-to-pilot ratio is above a particular threshold, and so on. Combiner 628 may also combine the pilot-based and data-based channel estimates (e.g., if the traffic-to-pilot ratio is within a particular range) and may disable combining otherwise. A decision on whether to combine or not combine may be made based on the qualities of the two channel estimates, which may be inferred from the traffic-to-pilot ratio. Good performance may be achieved by combining the channel estimates if their SNRs are similar and by using the better channel estimate if their SNRs are sufficiently different. If combining is enabled, then combiner 628 may perform unweighted or weighted combining of the pilot-based and data-based channel estimates. In any case, combiner 628 provides the output channel estimate used for coherent detection and interference estimation.

In an exemplary embodiment, the interference due to each data or control channel that has been recovered is estimated and removed from the input signal. Encoder/modulator 636 may process pilot and/or recovered signaling from a control channel in the same manner performed by the terminal and provide regenerated pilot and/or signaling symbols for the control channel. Encoder/modulator 636 may also process a correctly decoded packet from a data channel in the same manner performed by the terminal and provide regenerated data symbols for the data channel. A CDMA modulator 638 processes (e.g., spreads and scrambles) the regenerated pilot, signaling, and/or data symbols from unit 636 (e.g., as shown in FIG. 5) and generates output chips. A channel emulator 640 receives the output chips from CDMA modulator 638 and the output channel estimate from combiner 628, convolves the output chips with the output channel estimate, and provides an interference estimate for the control and/or data channels being canceled. Channel emulator 640 simulates the effects of the wireless channel. An interference subtraction unit 642 subtracts the interference estimate from the input signal and provides output samples/output signal.

FIG. 6 shows the processing units to recover all of the control and data channels shown in Table 1 and FIG. 5. These channels may be recovered in a sequential order, as described below. Only a subset of the processing units may be used for any given channel.

It is desirable to perform interference cancellation to achieve high performance. The power of non-HARQ channels (e.g., the DPCCH, DPDCH, E-DPCCH and HS-DPCCH) may be non-negligible and may increase significantly when the number of terminals increases. Hence, the interference from the non-HARQ channels should be canceled whenever possible.

An interference estimate for a physical channel is an estimate of the interference due to that physical channel. An interference estimate may also be referred to as a synthesized waveform or some other terminology. The accuracy of an interference estimate for a physical channel is dependent on (1) the reliability of the regenerated symbols for that physical channel and (2) the quality of the channel estimate used to generate the interference estimate. The reliability of the regenerated symbols for correctly decoded packets from the DPDCH and E-DPDCH is high. The reliability of the regenerated symbols for the control channels may be improved by exploiting any correlation between successive transmissions, as described below. The pilot-based channel estimate may be of marginal quality and may be used initially when a higher quality channel estimate is not available. The data-based channel estimate is typically better (and sometimes much better) in quality than the pilot-based channel estimate. The data-based channel estimate may be used whenever available.

The following observations may be made regarding interference cancellation.
1. Canceling relatively reliable information at an earlier stage may provide more benefits than canceling the same information at a later stage.
2. A more accurate interference estimate may be derived with a higher quality channel estimate.
3. A more accurate interference estimate may be derived with more reliable information.
4. The content of the E-DPCCH may be correlated across all transmissions of a given packet. Sequential decoding may be performed for the E-DPCCH to exploit this correlation and improve performance.

Observation 1 suggests canceling the non-HARQ channels at an earlier stage even though the decoding results for these non-HARQ channels and/or the available channel estimate may not be very reliable.

Observation 2 suggests using the data-based channel estimate from the DPDCH and/or E-DPDCH whenever available to derive the interference estimates for all channels. Observation 2 also suggests replacing the initial interference estimates derived using the pilot-based channel estimate with new interference estimates derived using the data-based channel estimate as soon as the data-based channel estimate becomes available.

Observation 3 suggests using more reliable information, if available, to derive the interference estimate.

Observation 4 suggests using decoded results from a later transmission of the E-DPCCH to infer information in earlier transmissions of the E-DPCCH. An interference estimate for the E-DPCCH may be derived with the decoded results as well as the inferred information.

Figure 7:
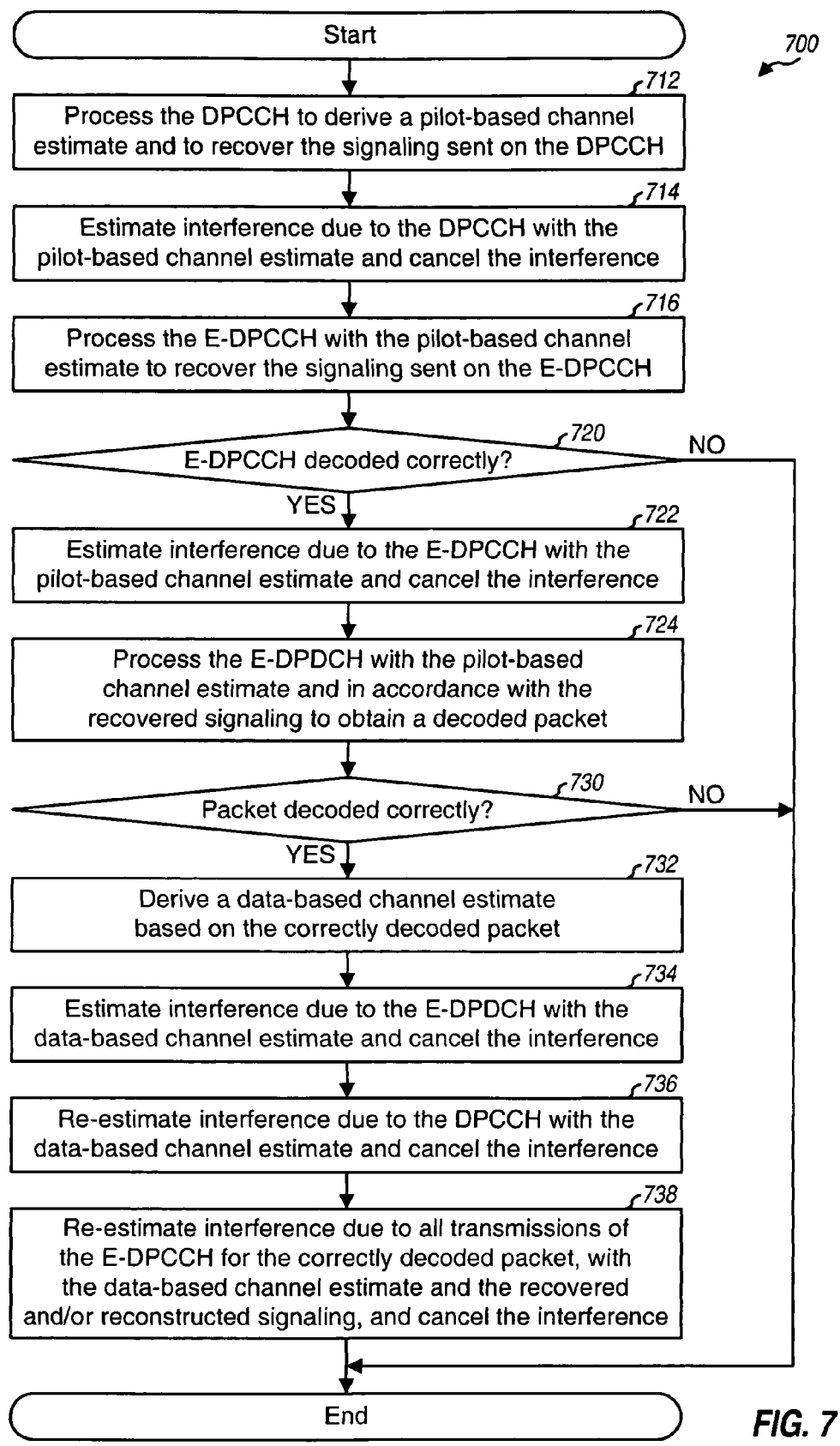
FIG. 7 shows a process performed by the base station to recover data and control channels for one terminal.

FIG. 7 shows an exemplary embodiment of a process 700 performed by the base station to recover the data and control channels for one terminal. For simplicity, process 700 assumes that the DPCCH, E-DPCCH and E-DPDCH are transmitted by the terminal. Initially, the DPCCH is processed to derive a pilot-based channel estimate and to recover the signaling (e.g., TPC bits) sent on the DPCCH (block 712). Interference due to the DPCCH may be estimated with the pilot-based channel estimate and canceled (block 714). The interference cancellation for the DPCCH may be omitted if the recovered information for the DPCCH is deemed unreliable. The E-DPCCH is then processed with the pilot-based channel estimate to recover the signaling (e.g., E-TFCI and RV) sent on the E-DPCCH (block 716). A determination is then made whether the E-DPCCH is decoded correctly (block 720). Blocks 716 and 720 are described in further detail below.

If the E-DPCCH is decoded correctly, as determined in block 720, then the interference due to the E-DPCCH is estimated with the pilot-based channel estimate and canceled (block 722). The E-DPDCH is then processed with the pilot-based channel estimate and in accordance with the recovered E-TFCI and RV to obtain a decoded packet for the E-DPDCH (block 724). A determination is then made whether the packet is decoded correctly (block 730).

If the packet is decoded correctly, as determined in block 730, then a data-based channel estimate is derived based on the correctly decoded packet (block 732). Interference due to the E-DPDCH is estimated with the data-based channel estimate and canceled (block 734). Interference due to the DPCCH may be re-estimated with the data-based channel estimate and canceled (block 736). Interference due to all transmissions of the E-DPCCH for the correctly decoded packet may be re-estimated with the data-based channel estimate and the recovered and/or reconstructed E-TFCI and RV, as described below, and canceled (block 738).

If the E-DPCCH is decoded in error, as determined in block 720, then the processing of the E-DPDCH may be skipped, and the process may terminate. If the packet for the E-DPDCH is decoded in error, as determined in block 730, then the interference cancellation in blocks 732 through 738 may be skipped, and the process may terminate.

Although not shown in FIG. 7, a data-based channel estimate may be derived from the E-DPCCH if it is correctly decoded. The data-based channel estimate from the E-DPCCH may be combined with the pilot-based channel estimate from the DPCCH. The combined channel estimate may be used to derive an interference estimate for the E-DPCCH as well as a new interference estimate for the DPCCH. These interference estimates may be canceled from the input signal prior to processing the E-DPDCH.

If the HS-DPCCH is transmitted, then the interference due to this channel may be (1) estimated with the pilot-based channel estimate and canceled in block 714 and/or (2) estimated with the data-based channel estimate and canceled in block 736.

If the DPDCH is transmitted, then this data channel may be processed (e.g., between blocks 714 and 716) in similar manner as the E-DPDCH. The DPDCH may be processed with the pilot-based channel estimate and in accordance with the TFCI recovered from the DPCCH to obtain a decoded packet for the DPDCH. If the packet is decoded correctly, then a data-based channel estimate may be derived based on the correctly decoded packet. Interference due to the DPDCH may be estimated with the data-based channel estimate and canceled. Interference due to the DPCCH may be re-estimated with the data-based channel estimate and canceled. The processing for the E-DPCCH and E-DPDCH may proceed after completing the processing for the DPCCH and DPDCH and may use the data-based channel estimate from the DPDCH (instead of the pilot-based channel estimate from the DPCCH), if available.

For the E-DPCCH, the signaling in each subframe comprises the 7-bit E-TFCI, the 2-bit RV, and the happy bit. The terminal encodes the 10-bit signaling with a block code to generate a 30-bit codeword and sends the codeword on the E-DPCCH in one subframe. The base station may process the E-DPCCH as follows. The base station may determine the received energy of the E-DPDCH, compare the received energy against a threshold, and declare the E-DPCCH to be present/transmitted if the received energy exceeds the threshold. If the E-DPCCH is present, then the base station may decode the received codeword, e.g., using maximum likelihood decoding, and provides the decoding hypothesis with the best metric as the recovered signaling for the E-DPCCH. Error detection coding (e.g., CRC) is not used for the E-DPCCH. Hence, for block 720 in FIG. 7, the E-DPCCH may be deemed as (1) correctly decoded if the received energy exceeds the threshold or (2) incorrectly decoded otherwise.

As shown in FIG. 3, the signaling for the E-DPCCH is correlated for all transmissions of a given packet. This correlation may be exploited to improve interference cancellation for the E-DPCCH. In the example shown in FIG. 3, after correctly decoding packet A in subframe $S_5$, the recovered signaling for the E-DPCCH in subframe $S_5$ is very reliable and may be used to reconstruct or infer the signaling sent on the E-DPCCH in prior subframes $S_1$ and $S_3$. The E-TFCI is the same for subframes $S_1$, $S_3$ and $S_5$. The RV sequentially increases across subframes $S_1$, $S_3$ and $S_5$. The happy bit in subframes $S_1$ and $S_3$ may be assumed to be equal to the happy bit received in subframe $S_5$. The reconstructed signaling for subframes $S_1$ and $S_3$ may be more reliable than the recovered signaling obtained earlier for these subframes. The interference due to the E-DPCCH in subframes $S_1$ and $S_3$ may be derived based on the reconstructed signaling for subframes $S_1$ and $S_3$, respectively, and the data-based channel estimate from the E-DPDCH. The interference due to the E-DPCCH in subframe $S_5$ may be derived based on the recovered signaling for subframe $S_5$ and the data-based channel estimate. The new interference estimates for subframes $S_1$ and $S_3$, which are derived based on the reconstructed signaling and the data-based channel estimate, may then replace the initial interference estimates for subframes $S_1$ and $S_3$, which are derived based the recovered signaling and the pilot-based channel estimate.

For the HS-DPCCH, the base station may configure the terminal to repeat ACK/NAK transmission up to four times to improve the likelihood of decoding the ACK/NAK. This information may be used to estimate the interference due to the HS-DPCCH.

The base station may perform interference cancellation early for ACK-to-NAK errors. The base station may decode a packet correctly and may send an ACK to the terminal. The terminal may erroneously detect the ACK as a NAK and may then send a retransmission of the packet. The base station may decode the E-DPCCH and, based on the RV value, recognize that a retransmission is being sent for the correctly decoded packet. The base station may then use the correctly decoded packet to estimate and cancel the interference due to this retransmission, without having to decode the retransmission. This early interference cancellation may benefit subsequent channels and/or terminals to be recovered. The base station may also update the data-based channel estimate with the retransmission.

The processing in FIG. 7 may be performed whenever a new transmission is received on any control or data channel from any terminal. Different physical channels may be associated with different TTIs, and the transmissions for these channels may be received at different rates.

Whenever a packet on a data channel is decoded correctly, a data-based channel estimate may be derived from the packet. The interference due to the data channel as well as the accompanying control channel may be estimated with the data-based channel estimate and canceled from the input signal. For an HARQ channel such as the E-DPDCH, a correctly decoded packet may be sent in one transmission or multiple re/transmissions. The interference from the E-DPDCH may be estimated for all re/transmissions of the correctly decoded packet and may be subtracted from the input signal. The interference from non-HARQ channels (e.g., the DPCCH, E-DPCCH and HS-DPCCH) may be (1) re-estimated for all transmissions of these channels which are covered by the data-based channel estimate and (2) subtracted from the input signal. The new interference estimates derived with the data-based channel estimate may be more accurate than the initial interference estimates derived with the pilot-based channel estimate. This allows for cancellation of more interference from the non-HARQ channels. Other channels and/or other terminals may benefit from having more interference canceled from the input signal.

In general, the interference cancellation may be performed as follows:
1. Attempt to cancel interference whenever it is possible,
2. Use data-based channel estimate, if available, for interference cancellation for all channels including non-HARQ channels, and
3. Replace less accurate interference estimates with more accurate interference estimates when the data-based channel estimate and/or more reliable information are available.

For goal 1, the control channels (e.g., the DPCCH, E-DPCCH and HS-DPCCH) may be canceled after receiving transmissions on these control channels. The amount of interference cancellation is determined by the quality of the channel estimate and the reliability of the regenerated symbols used to derive the interference estimate. The pilot-based channel estimate may be used when the data-based channel estimate is not available. The control channels may be canceled prior to decoding the data channels (e.g., the DPDCH and E-DPDCH).

For goal 2, if a data channel (e.g., the DPDCH or E-DPDCH) is decoded correctly, then a data-based channel estimate may be derived from the data channel and used to derive interference estimates for all data and control channels.

For goal 3, new interference estimates may be derived whenever the data-based channel estimate and/or more reliable information are available. The new interference estimates may be derived for all transmissions covered by the data-based channel estimate, e.g., signaling transmissions on the E-DPCCH in subframes $S_1$, $S_3$ and $S_5$ in the example shown in FIG. 3. The new interference estimates replace the initial interference estimates and are canceled prior to decoding other channels and/or other users.

The techniques described herein support early interference cancellation of the control channels (e.g., the DPCCH, E-DPCCH and HS-DPCCH) with the available channel estimate, without having to wait until the associated data channels are correctly decoded. The techniques also support re-estimation of the interference from the control channels with data-aided channel estimate and/or more reliable information obtained after successful decoding of the data channels.

Figure 8:
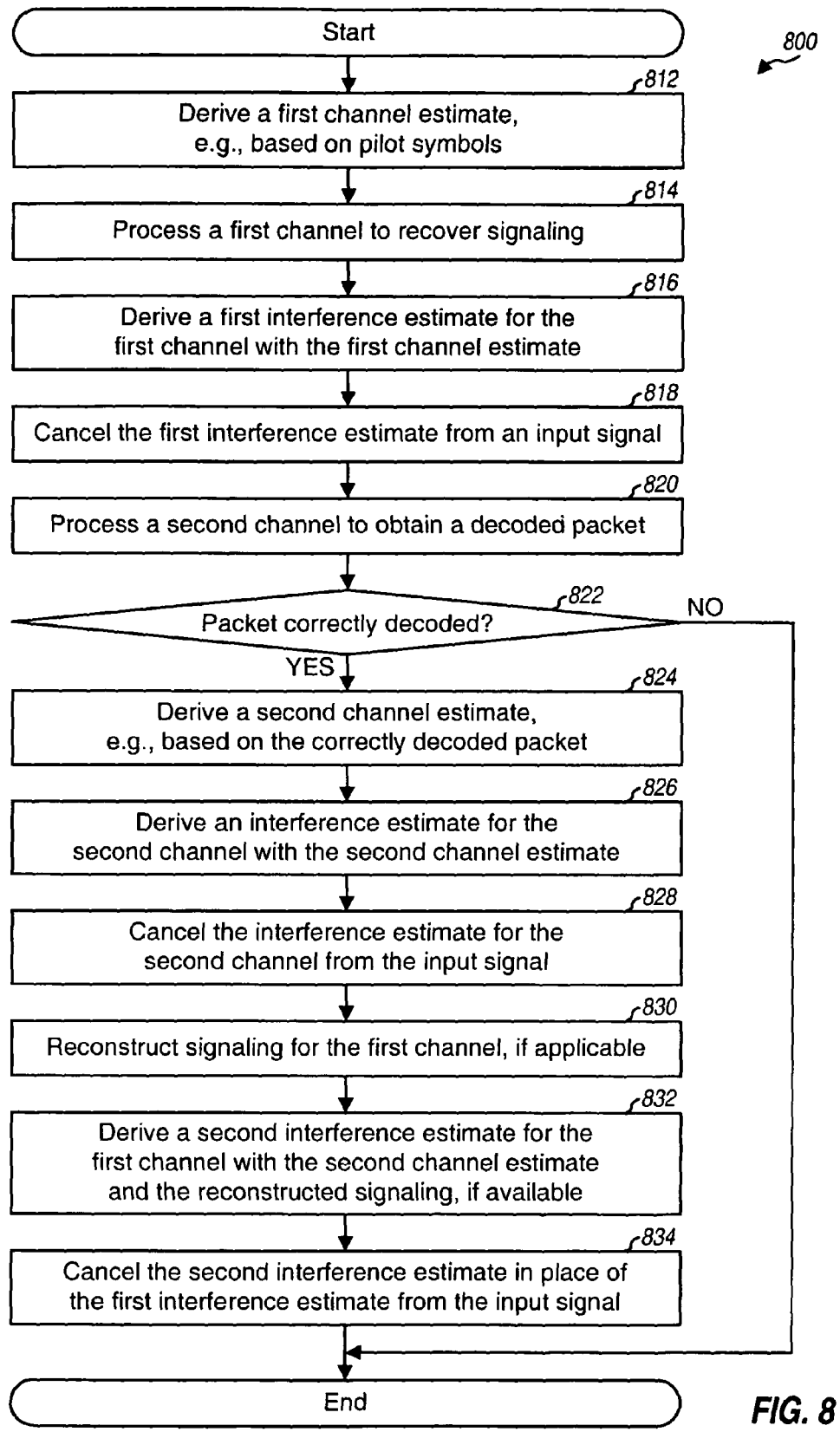
FIG. 8 shows a process for recovering data and control channels.

FIG. 8 shows an exemplary embodiment of a process 800 for recovering data and control channels. A first channel estimate is derived, e.g., based on pilot symbols (block 812). A first channel is processed to recover signaling (block 814). A first interference estimate for the first channel is derived with the first channel estimate (block 816) and canceled from an input signal (block 818). A second channel is processed to obtain a decoded packet (block 820). A determination is made whether the packet is decoded correctly (block 822). If the answer is 'No', then the process terminates. Otherwise, a second channel estimate is derived, e.g., based on the correctly decoded packet (block 824). An interference estimate for the second channel is derived with the second channel estimate (block 826) and canceled from the input signal (block 828). Signaling for the first channel may be reconstructed, if applicable (block 830). A second interference estimate for the first channel is derived with the second channel estimate and the reconstructed signaling, if available (block 832). The second interference estimate for the first channel is canceled from the input signal in place of the first interference estimate (block 834). Processing for other channels and/or other users may proceed in similar manner.

The first channel may be the DPCCH, E-DPCCH, or some other channel. The second channel may be the DPDCH, E-DPDCH, or some other channel. The first channel estimate may be derived from the DPCCH or some other channel.

FIGS. 7 and 8 show the processing for one terminal. Multiple (K) terminals may be processed with successive interference cancellation (SIC) and/or parallel interference cancellation (PIC). With SIC, the K terminals are processed sequentially in K stages, one terminal in each stage. The first stage processes the input signal from receiver 454 for the first terminal, and the output signal from the first stage is used as an input signal for the second stage. Each subsequent stage processes the input signal from a preceding stage for one terminal and provides an output signal for the next stage.

With PIC, all terminals may be processed in the first round. The interference from all terminals successfully decoded in the first round may be estimated and canceled from the input signal. Terminals not successfully decoded in the first round may then be processed again using the interference-canceled signal. The processing may continue until all terminals are successfully decoded or the interference from all successfully decoded terminals has been canceled.

With a combination SIC and PIC, the terminals may be arranged into groups, e.g., based on their SNRs. The groups may be processed sequentially, one group at a time. The terminals in each group may be processed in parallel.

With interference cancellation, the SNR of each terminal is dependent on the stage/order in which the terminal is recovered. The SNR of the first terminal may be the worst since no interference has been removed. The SNR of the next terminal may be better since the interference from the first terminal has been removed. The SNR of the last terminal may be the best since the interference from all prior terminals have been removed. In general, SNR progressively improves the later a terminal is recovered.

The techniques described herein may improve interference cancellation for non-HARQ channels, which may become a bottleneck when the number of users increases. The techniques cancel the interference due to the non-HARQ channels early when transmissions are first received on these channels. The techniques also re-estimate and re-cancel the interference due to the non-HARQ channels when higher quality channel estimate and/or more reliable information are available for these channels.

For clarity, the techniques have been described specifically for HSUPA in UMTS. In general, the techniques may be used for any wireless communication network that supports non-HARQ channels and/or HARQ channels. For example, the techniques may be used for cdma2000 networks such as a CDMA2000 1X network that implements IS-2000 Releases 0 and A, a CDMA2000 1xEV-DV network that implements IS-2000 Release C, and a CDMA2000 1xEV-DO network that implements IS-856. The techniques may be used for the uplink, e.g., as described above, as well as for the downlink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the exemplary embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is in communication with (e.g., coupled to) the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. An apparatus comprising:
   at least one processor to derive a first interference estimate for a first channel based on a first channel estimate, to cancel the first interference estimate from an input signal, to process at least a second channel with at least the first channel estimate to obtain a decoded packet, and to perform the following if the decoded packet is a correctly decoded packet:
   (a) derive a second interference estimate for the first channel based on at least a second channel estimate that is based on the correctly decoded packet, and a reconstructed signal of the first channel; and
   (b) cancel the second interference estimate from the input signal; and
   a memory in communication with the at least one processor;
   wherein the at least one processor derives the first channel estimate based on pilot symbols and derives the second channel estimate based on data symbols.

2. The apparatus of claim 1, wherein the second channel comprises an E-DCH Dedicated Physical Control Channel (E-DPCCH) or an E-DCH Dedicated Physical Data Channel (E-DPDCH).

3. The apparatus of claim 1, wherein the at least one processor derives a third interference estimate for the second channel based on the second channel estimate and the correctly decoded packet, and cancels the third interference estimate from the input signal.

4. The apparatus of claim 1, wherein the at least one processor derives the second channel estimate for multiple time intervals in which the correctly decoded packet is sent, and derives the second interference estimate for the multiple time intervals.

5. The apparatus of claim 1, wherein the at least one processor reconstructs data sent on the first channel in multiple time intervals in which the correctly decoded packet is sent, and derives the second interference estimate for the first channel based on the second channel estimate and the reconstructed signal of the first channel.

6. The apparatus of claim 1, wherein the at least one processor derives and cancels the first and second interference estimates for a first terminal and processes the reconstructed signal to recover signaling and data for a second terminal.

7. The apparatus of claim 1, wherein the first channel is a control channel and the second channel is a data channel.

8. The apparatus of claim 7, wherein the first channel carries signaling for the second channel.

9. The apparatus of claim 1, wherein the first channel is sent without hybrid automatic retransmission (HARQ) and the second channel is sent with HARQ.

10. The apparatus of claim 1, wherein the at least one processor derives the first channel estimate based on pilot symbols from a Dedicated Physical Control Channel (DPCCH), and derives the second channel estimate based on data symbols from an E-DCH Dedicated Physical Data Channel (E-DPDCH).

11. The apparatus of claim 10, wherein the first channel is the DPCCH or an E-DCH Dedicated Physical Control Channel (E-DPCCH).

12. A method comprising:
deriving a first interference estimate for a first channel based on a first channel estimate;
using an antenna for receiving an input signal;
canceling the first interference estimate from the input signal;
processing at least a second channel with at least the first channel estimate to obtain a decoded packet; and
performing the following if the decoded packet is a correctly decoded packet:
(a) deriving a second interference estimate for the first channel based on at least a second channel estimate that is based on the correctly decoded packet, and a reconstructed signal of the first channel;
(b) canceling the second interference estimate from the input signal; and
further comprising:
deriving the first channel estimate based on pilot symbols; and
deriving the second channel estimate based on data symbols.

13. The method of claim 12, wherein the-second channel comprises an E-DCH Dedicated Physical Control Channel (E-DPCCH) or an E-DCH Dedicated Physical Data Channel (E-DPDCH).

14. The method of claim 12, further comprising:
deriving the second channel estimate for multiple time intervals in which the correctly decoded packet is sent, and wherein the second interference estimate is derived for the multiple time intervals.

15. The method of claim 12, wherein the first and second interference estimates are derived and canceled for a first terminal, the method further comprising:
processing the reconstructed signal to recover signaling and data for a second terminal.

16. An apparatus comprising:
means for deriving a first interference estimate for a first channel based on a first channel estimate;
means for canceling the first interference estimate from an input signal;
means for processing at least a second channel with at least the first channel estimate to obtain a decoded packet; and
means for performing the following if the decoded packet is a correctly decoded packet:
(a) deriving a second interference estimate for the first channel based on at least a second channel estimate that is based on the correctly decoded packet, and a reconstructed signal of the first channel;
(b) canceling the second interference estimate from the input signal; and
further comprising:
means for deriving the first channel estimate based on pilot symbols; and
means for deriving the second channel estimate based on data symbols.

17. The apparatus of claim 16, wherein the second channel comprises an E-DCH Dedicated Physical Control Channel (E-DPCCH) or an E-DCH Dedicated Physical Data Channel (E-DPDCH).

18. The apparatus of claim 16, further comprising:
means for deriving the second channel estimate for multiple time intervals in which the correctly decoded packet is sent, and wherein the second interference estimate is derived for the multiple time intervals.

19. The apparatus of claim 16, wherein the first and second interference estimates are derived and canceled for a first terminal, the apparatus further comprising:
means for processing the reconstructed signal to recover signaling and data for a second terminal.

20. A computer program product embodied on a computer-readable storage medium and comprising code that, when executed, causes a computer to perform the following:
derive a first interference estimate for a first channel based on a first channel estimate;
cancel the first interference estimate from an input signal;
process at least a second channel with at least the first channel estimate to obtain a decoded packet; and
perform the following if the decoded packet is a correctly decoded packet:
(a) derive a second interference estimate for the first channel based on at least a second channel estimate that is based on the correctly decoded packet, and a reconstructed signal of the first channel; and
(b) cancel the second interference estimate from the input signal.

21. The computer program product of claim 20, wherein the code, when executed, further causes the computer to perform the following:
derive the first channel estimate based on pilot symbols; and
derive the second channel estimate based on data symbols.

22. The computer program product of claim 20, wherein the second channel comprises an E-DCH Dedicated Physical Control Channel (E-DPCCH) or an E-DCH Dedicated Physical Data Channel (E-DPDCH).

23. The computer program product of claim 20, wherein the code, when executed, further causes the computer to perform the following:
derive the second channel estimate for multiple time intervals in which the correctly decoded packet is sent, and wherein the second interference estimate is derived for the multiple time intervals.

24. The computer program product of claim 20, wherein the first and second interference estimates are derived and canceled for a first terminal, and wherein the code, when executed, further causes the computer to perform the following:
process the reconstructed signal to recover signaling and data for a second terminal.

* * * * *